United States Patent [19]

Ellis

[11] Patent Number: 4,725,117

[45] Date of Patent: Feb. 16, 1988

[54] OPTICAL FIBER CONTACT AND METHOD OF TERMINATING AN OPTICAL FIBER USING SAME

[75] Inventor: Roger H. Ellis, Atherton, Calif.

[73] Assignee: Raychem Corporation, Menlo Park, Calif.

[21] Appl. No.: 671,144

[22] Filed: Nov. 13, 1984

[51] Int. Cl.⁴ .......................... G02B 6/36; B31B 1/60; C03B 23/20

[52] U.S. Cl. ............................ 350/96.20; 350/96.21; 350/320; 156/60; 156/84; 156/85; 156/86; 65/3.11; 65/4.1; 65/4.2

[58] Field of Search ............... 350/96.10, 96.20, 96.21, 350/96.22, 320; 156/49, 51, 52, 53, 56, 60, 73.2, 73.4, 84, 85, 86; 65/1, 2, 3.1, 3.4, 3.43, 3.44, 4.1, 4.2, 3.11

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,597,372 | 8/1971 | Cook . |
| 4,129,932 | 12/1978 | Stancati ............................ 350/96.21 |
| 4,148,554 | 4/1979 | Magnusson et al. ............. 350/96.21 |
| 4,261,644 | 4/1981 | Giannaris ......................... 350/96.21 |
| 4,290,668 | 9/1981 | Ellis et al. ........................ 350/96.20 |
| 4,408,353 | 10/1983 | Bowen et al. ..................... 350/96.16 |
| 4,509,820 | 4/1985 | Murata et al. .................... 350/96.21 |
| 4,628,989 | 12/1986 | Parker et al. ..................... 156/85 X |
| 4,664,732 | 5/1987 | Campbell et al. ............. 350/96.21 X |
| 4,679,907 | 7/1987 | Campbell et al. ............. 350/96.21 X |
| 4,697,872 | 10/1987 | Serrander ........................ 350/96.21 |

FOREIGN PATENT DOCUMENTS

| | | | |
|---|---|---|---|
| 0118804 | 9/1984 | European Pat. Off. ......... 350/96.21 |
| 0119013 | 9/1984 | European Pat. Off. ......... 350/96.21 |
| 2512218 | 3/1983 | France ............................. 350/96.21 |

*Primary Examiner*—William L. Sikes
*Assistant Examiner*—Brian M. Healy
*Attorney, Agent, or Firm*—Dennis E. Kovach; Herbert G. Burkard

[57] ABSTRACT

An optical fiber contact for terminating an optical fiber includes a memory tube material having a first section which has been recovered around a pigtail optical fiber. A second section of the memory material is nonrecovered, and an optical fiber is terminated by inserting a cleaved or polished end of the optical fiber into the nonrecovered tube section and recovering this tube section around the cleaved or polished optical fiber end. A plurality of contacts are disposed in first and second linear arrays which are then optically interconnected with an optical fiber contact assembly.

26 Claims, 12 Drawing Figures

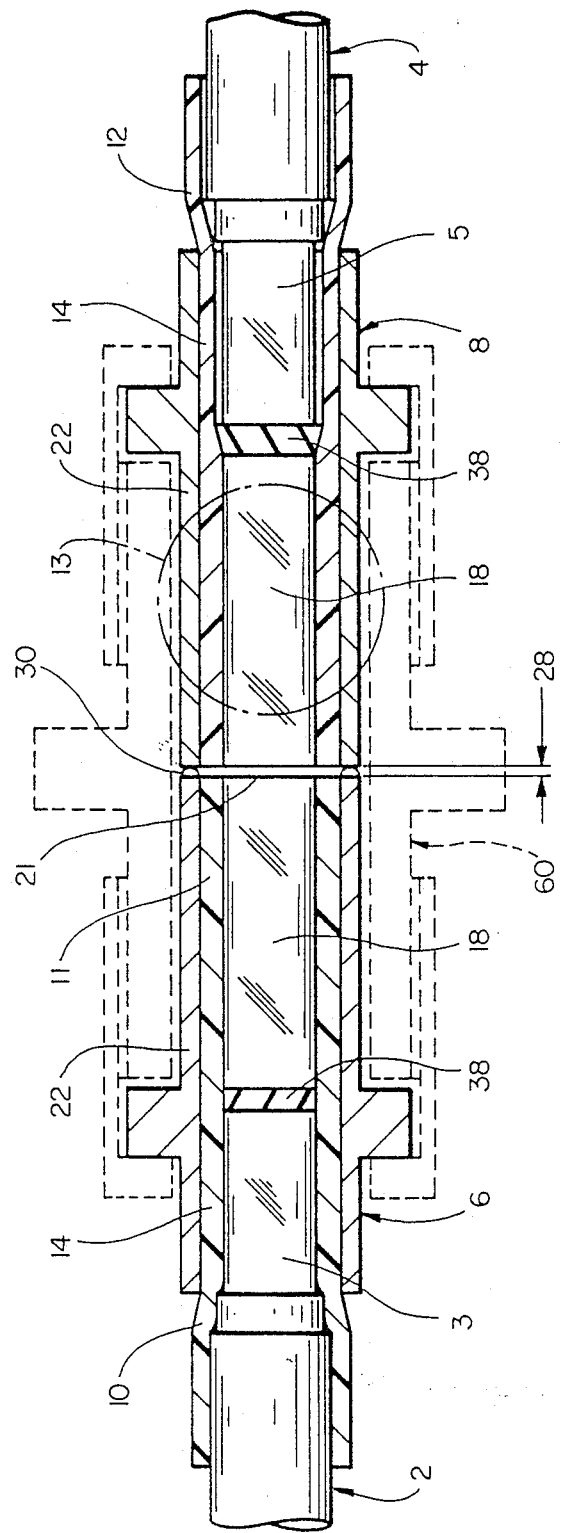
FIG_1A

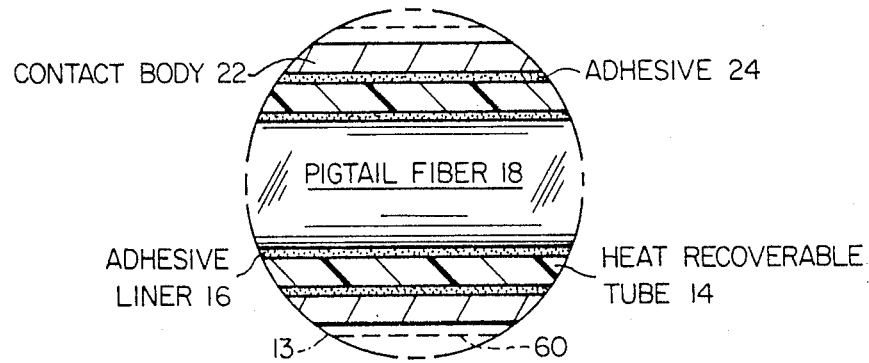
FIG_1B
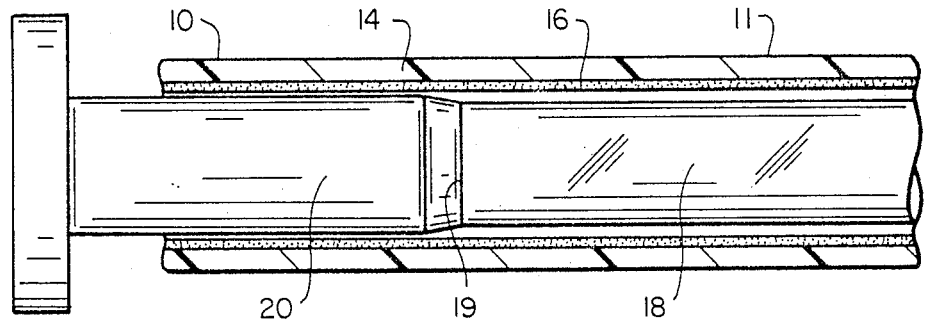
FIG_2
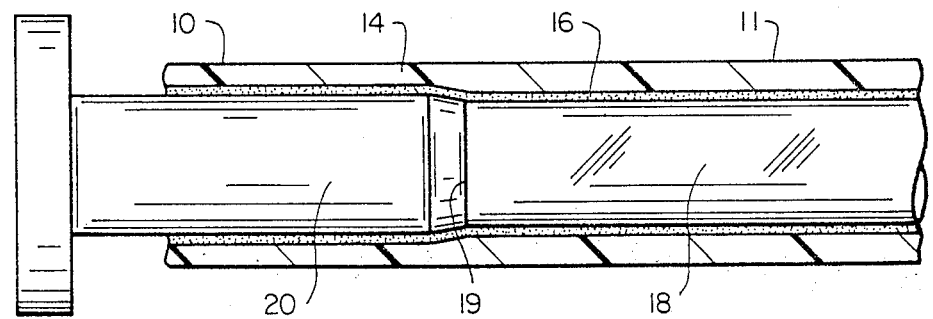
FIG_3

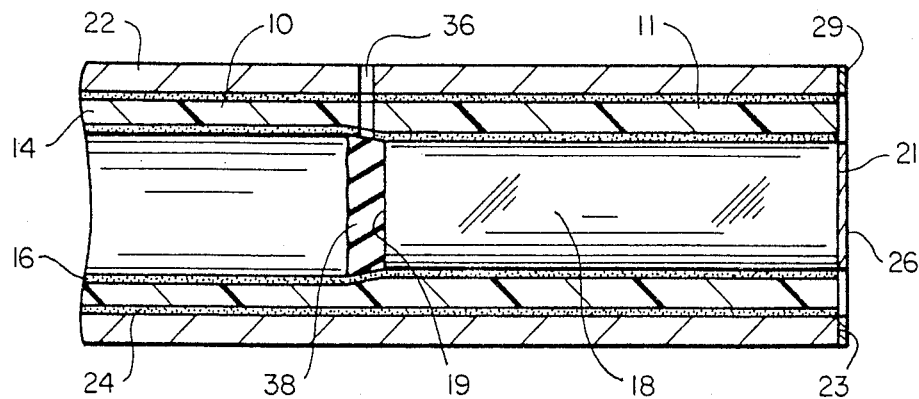
FIG_4
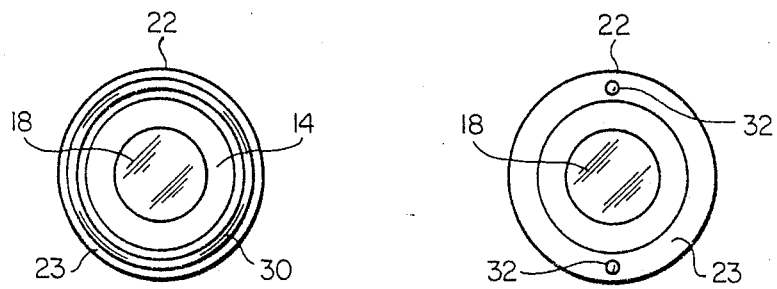
FIG_5A  FIG_5B
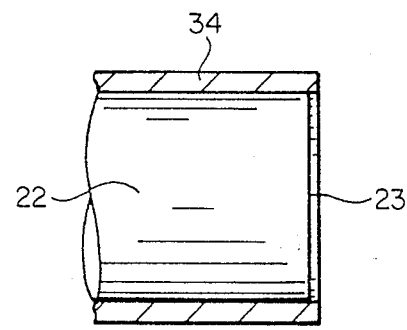
FIG_5C

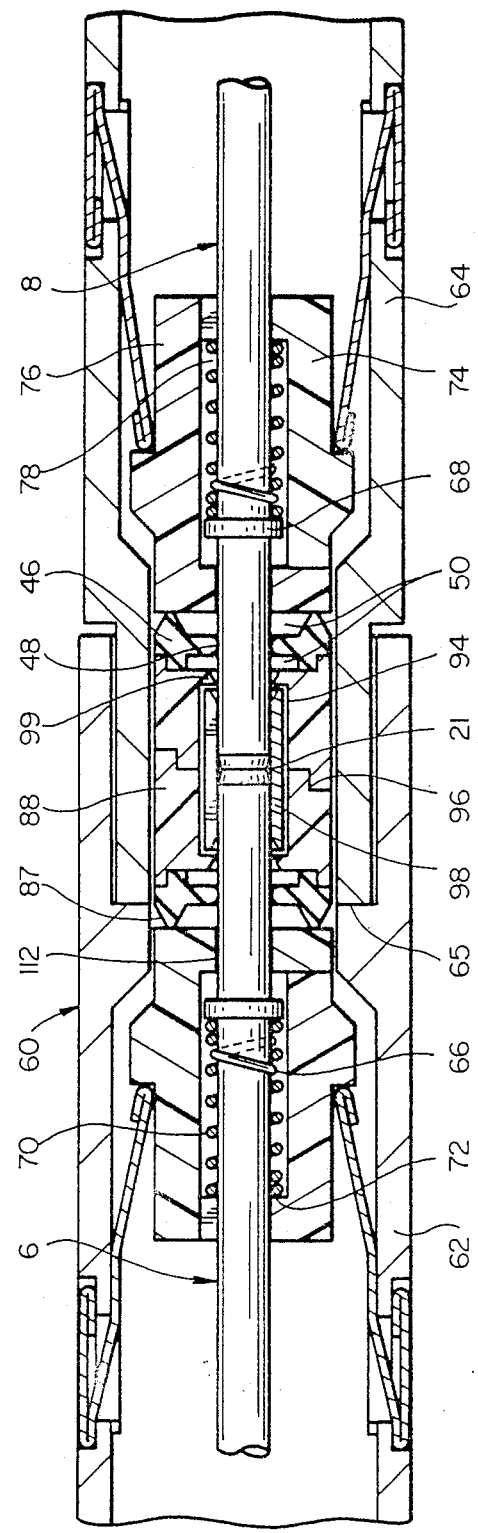
FIG_6

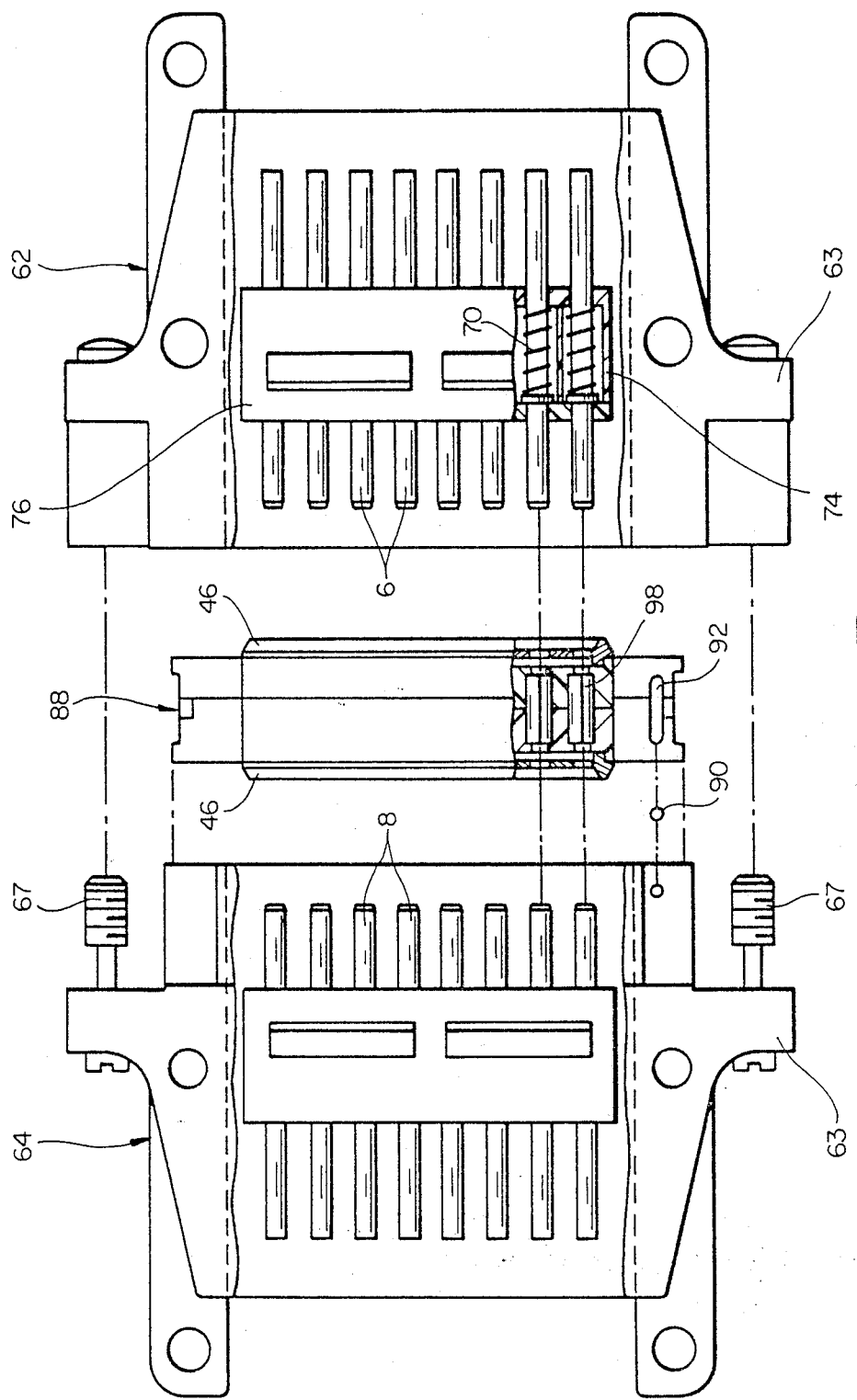

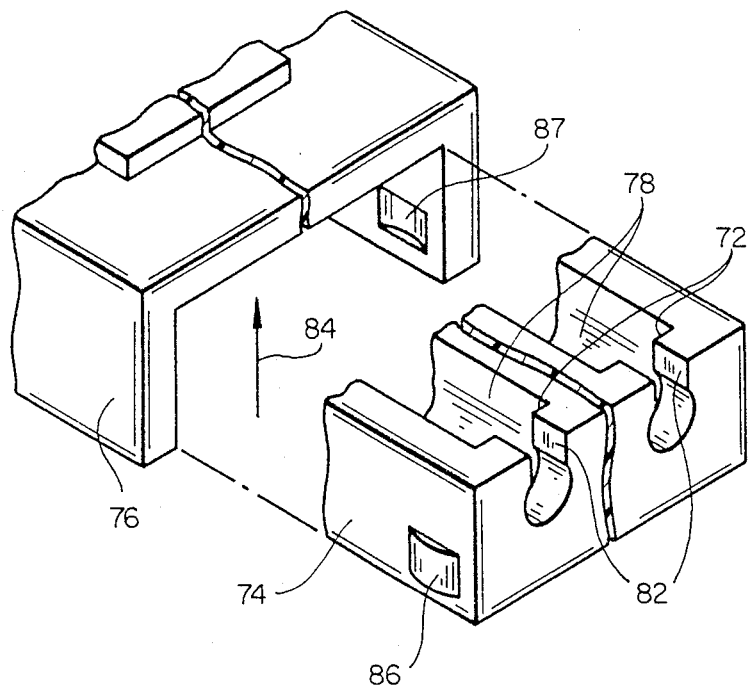
FIG_8
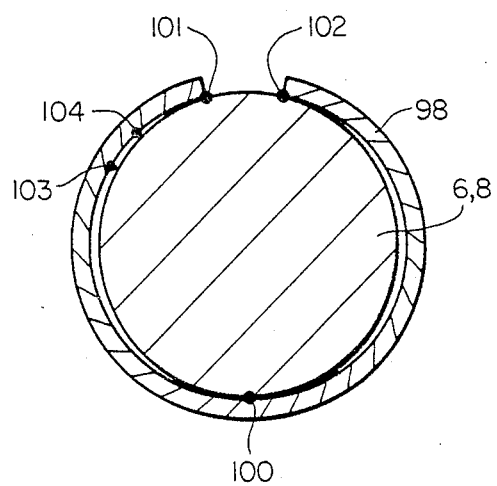
FIG_9

OPTICAL FIBER CONTACT AND METHOD OF TERMINATING AN OPTICAL FIBER USING SAME

BACKGROUND OF THE INVENTION

The present invention relates to an optical fiber contact assembly, and more specifically to an optical fiber contact which forms part of an assembly described and claimed in co-pending U.S. application entitled "Optical Fiber Contact Assembly", this application being filed concurrently herewith. The contact is used for terminating an optical fiber to be optically connected to a second optical fiber similarly terminated.

Numerous optical fiber connection assemblies have been proposed in the prior art with each possessing several disadvantages. In particular, most assemblies require the craftsman to align a fiber to be connected with a contact, this being often times extremely difficult because of small tolerances involved when trying to precisely position an optical fiber core within the contact. Not only is the craftsman responsible for the precise positioning, the craftsman is also required to epoxy the optical fiber to be terminated within the contact, and is furthermore responsible for carefully preparing an end of the optical fiber after it has been epoxied within the contact so that a good optical surface exists to be matable with another contact. Furthermore, the craftsman is required to control intermating dimensions between first and second contacts expoxied to first and second fibers to be connected. Such procedures are extremely craft-sensitive and hard to reliably and repeatably perform in the field where specialized equipment accessible in the laboratory is often not available, making connections with prior art connection assemblies inherently unfavorable.

Other types of connection assemblies incorporate either liquids, greases, or lenses as part of an interface construction between contacts to be mated, the disadvantage with liquids being the possibility of contamination and spillage, with the problem of lenses being related to complexity of design of the fiber and lens interface as well as poor resistance to radiation since lenses often turn black when irradiated.

SUMMARY OF THE INVENTION

Accordingly, it is an object of the present invention to eliminate the above-noted drawbacks and to provide an optical fiber contact usable in an assembly which does not require that the user epoxy, polish, or control an intermating dimension between contacts being aligned and connected.

It is a further object of the present invention to provide an optical fiber contact, usable with an optical fiber contact assembly, which is relatively simple in construction and does not require the use of any type of lens system.

It is a further object of the present invention to eliminate the requirement that the craftsman center, polish, and control an intermating dimension of an optical fiber contact being connected to another optical fiber contact.

These and other objects of the present invention are achieved by an optical fiber contact which includes a first tube made of a memory material having an adhesive liner therein, the tube having previously being expanded. A pigtail optical fiber, having a cleaved or polished back end, is installed in the first tube section which is subsequently recovered causing it to shrink radially inward and tightly adhere to the pigtail optical fiber. A second tube section adjacent to the first tube section is prevented from recovering as the first tube section is recovered. Thereafter, the tube is adhesively secured to a contact body, preferably made of metal, while precisely positioning the center of a core of the pigtail optical fiber within a geometric axial center of the contact body. The front end of the pigtail optical fiber is then ground square, polished, and preferably coated with an anti-reflective coating. Means are provided for recessing this polished, coated front end of the pigtail optical fiber so that a precisely formed interface dimension results when this optical fiber contact is connected to a second optical fiber contact in an assembly.

With an optical fiber contact constructed as described, the craftsman simply strips the jacket and buffer from an optical fiber to be terminated, cleaves its end, and places the cleaved end into the second tube section of the optical fiber contact. The second tube section is then heat recovered which causes the second tube section to shrink radially inward thus securing the cleaved end within the optical fiber contact. Since an index-matching grease has previously been installed adjacent the back end of the pigtail optical fiber in the optical fiber contact, the optical fiber is now optimally terminated and ready to be connected to a second similarly terminated optical fiber via an optical fiber contact assembly.

BRIEF DESCRIPTION OF THE DRAWINGS

FIGS. 1A, 1B illustrate partial cross-sectional views of a contact assembly constructed according to a preferred embodiment of the present invention;

FIG. 2 illustrates part of an optical fiber contact shown in FIG. 1 prior to its being secured to a pigtail optical fiber;

FIG. 3 illustrates the optical fiber contact of FIG. 2 subsequent to it being secured to the pigtail optical fiber;

FIG. 4 is an illustration of a front end of one embodiment of a completed optical fiber contact;

FIGS. 5a-5c illustrates three embodiments for controlling an interface dimension between first and second optical fiber contacts to be connected by a contact assembly;

FIG. 6 illustrates a side, partial cross-sectional view of one embodiment of an optical fiber contact assembly for connecting optical fiber contacts constructed in accordance with the present invention;

FIG. 7 is a top view of the assembly shown in FIG. 6.

FIG. 8 is a perspective view of wafers utilized in the optical fiber contact assembly of FIGS. 6 and 7; and FIG. 9 is an end view of an alignment sleeve shown in FIG. 6.

DESCRIPTION OF THE PREFERRED EMBODIMENTS

Referring first to FIG. 1A, an optical fiber contact assembly 60 is schematically shown, and this assembly optically aligns and connects first and second optical fibers 2, 4. The first optical fiber 2 has been terminated to a first optical fiber contact 6 by inserting a stripped and cleaved front end 3 of the first optical fiber into a back end of the first optical fiber contact 6, and then recovering a back end tube section 10 of the first optical fiber contact 6 around the stripped and cleaved end 3.

In this figure a back end tube section 12 of the contact 8 has not been recovered onto a stripped and cleaved front end 5 of the second optical fiber 4, the section 12 being shown in its nonrecovered state in FIG. 1 to more clearly illustrate the present invention, though it should be understood that the tube section 12 would be recovered and connected to the stripped and cleaved end 5 prior to connecting the second optical fiber contact 8 with the first optical fiber contact 6 using the optical fiber contact assembly 60.

Throughout the figures, dimensions are not shown to scale and in many instances are exaggerated to more clearly illustrate various features of the invention. Each optical fiber contact 6, 8 preferably, though not necessarily, is identical in construction and several elements thereof within circle 13 are more clearly illustrated in FIG. 1B. Each contact 6, 8 includes a heat-recoverable tube 14 which is constructed of a memory material, e.g., any material exhibiting the property of elastic or plastic memory as described, for example, in U.S. Pat. No. 2,027,962; 3,086,242; and 3,597,372; the disclosures of which are incorporated herein by reference. The memory material is first shaped into the shape of a tube, and subsequently either expanded longitudinally or circumferentially, and preferably both longitudinally and circumferentially. Such an expanded tube exhibits the property that upon being recovered, it tends to recover to its original nonexpanded tube shape as is well understood in the art. Recovery is generally accomplished by heating, though other means can be used. An adhesive liner 16 is disposed on an inner surface of the expanded heat-recoverable tube 14 to facilitate bonding to a pigtail optical fiber 18 at the back ends 3, 5.

FIGS. 2–4 illustrate various stages through which the optical fiber contact 6, 8 proceeds during manufacturing. In FIG. 2, the pigtail optical fiber 18 is shown disposed within the expanded heat-recoverable tube 14 and the adhesive liner 16 prior to recovery of the tube 14. The pigtail optical fiber 18 is disposed in a front end section 11 of the tube 14, and a mandrel 20 is disposed in the back end section 10 of the tube 14. The mandrel 20 prevents any recovery of the back end section 10 as the front end section 11 is recovered around the pigtail optical fiber 18, preferably using heat. If desired, an outer circumferential surface of the front end section 11 can be confined during recovery to enhance radial shrinkage of the section 11. Adherence strength between the pigtail optical fiber 18 and the front end section 11 of the tube 14 is enhanced by hoop forces generated during recovery of the front end section 11, as well as by the adhesive 16 located between the pigtail optical fiber and the front end section 11. Preferably, the adhesive 16 comprises a hot-melt adhesive which, once cooled, possesses sufficient bonding strength and hardness to keep the pigtail optical fiber aligned and bonded in place to the front end section 11. The adhesive 16 further functions to provide a void- and moisture-free installation which eliminates the formation of microcracks from forming on a surface of the pigtail optical fiber 3 which has had its buffer coating removed (in the case of a glass-on-glass pigtail optical fiber).

The pigtail optical fiber 18 preferably comprises an identical-type fiber as the fiber 2 or 4 to be terminated. In the event the fiber to be terminated comprises a plastic clad silica optical fiber, then optimally the pigtail optical fiber would also comprise a plastic-clad silica fiber. In this case, the plastic cladding of the pigtail optical fiber would be removed prior to securing the pigtail optical fiber within the front end section 11 of the tube 14. In this event, the adhesive 16 preferably should have a lower index of refraction than the core of the pigtail optical fiber 18 so as to form a waveguide therewith. A suitable material for the adhesive is $PVF_2$ (polyvinylidine fluoride), such a material being described in U.S. Pat. No. 4,290,668, the disclosure of which is incorporated herein by reference. Another material is polyamide.

When the pigtail optical fiber is a glass-on-glass optical fiber, its buffer is removed, and in this case the adhesive material 16 is made from a material which forms a secure bond to glass, such as a water-resistant epoxy, so as to prevent moisture from attacking an outer glass surface of the pigtail optical fiber.

The tube 14 and adhesive liner 16 are preferably formed of materials which have a certain percentage, e.g., 10–40%, of longitudinal shrink so as to allow the tube 14 and adhesive liner 16 to shrink longitudinally when recovered which aids in bonding and aligning the pigtail optical fiber 3 with the stripped and cleaved front end 3 of the optical fiber 2 to be terminated when the back end section 10 is recovered onto the end 3, as subsequently described. The tube 14 and liner 16 can have up to 100% radial shrink. Regardless of the type of pigtail optical fiber used, either plastic-clad silica or glass-on-glass, a back end 19 of the pigtail optical fiber 18 is either cleaved or polished prior to securing the pigtail optical fiber within the front end section 11 of the tube 14.

Referring next to FIG. 4, subsequent to securing the pigtail optical fiber 18 within the front end section 11, the mandrel 20 is removed from the back end section 10 of the tube 14, and the tube 14 is secured to a contact body 22, preferably made of metal, in such a manner so as to position the center axis of the pigtail optical fiber 18 within a geometric center of the metal contact body 22. The tube 14 is secured to the contact body 22 via a second adhesive liner 24, and care is taken to keep the back end section 10 of the tube 14 from recovering when the contact body 22 is secured to the tube 14. Thereafter, a front end 21 of the pigtail optical fiber 18 is ground and made square, polished, and preferably coated with an anti-reflective coating 26.

FIGS. 4 and 5a–5c illustrate four embodiments for controlling an interface spacing 28 (see FIG. 1A) between mating first and second optical fiber contacts 6, 8 optically connected by the optical fiber contact assembly 60. In FIG. 4, a thin film 29, preferably metal, has been deposited on a front face 23 of the contact body 22. In the embodiment of FIG. 5A, a circular ridge 30 is formed on the front face 23 of the contact body 22, this ridge bottoming on a similar ridge formed on a mating contact when connected thereto by the assembly 60, as generally illustrated in FIG. 1. In FIG. 5B shall protuberances 32 are formed on the front end 23 of the contact body 22. According to this embodiment, the protuberances are designed to have a height equal to the desired interface spacing 28 since the protuberances on one contact are not intended to bottom on the protuberances of a mating contact; whereas in the embodiment of FIG. 5a, a height of the ridge 32 is equal to one-half the desired interface spacing 28 since the ridge 30 is designed to bottom on a similar ridge on the mating contact. In the embodiment of FIG. 5c, a sleeve 34 is secured around the contact body 22, the sleeve extending beyond the front face 23 of the contact body 22 a predetermined and precisely controlled distance which again is equal to one-half the desired interface spacing 28.

Preferably, aligned bores 36 (FIG. 4) are formed in the tube 14, the contact body 22 (including adhesives 16, 24), and the sleeve 34 (if utilized), the bores 36 being utilized for injecting an index-matching grease 38 adjacent to the back end 19 of the pigtail optical fiber 18 to optimize optical contact between the back end 19 and a front end 3 of the optical fiber being terminated. Subsequent to injecting the grease 38 as described, preferably a plug (not shown) is inserted into a back end of the contact 6, 8 to prevent contamination of the contact, which plug is removed when the craftsman wishes to terminate the optical fiber 2. Alternatively, the index-matching grease 38 can be disposed on a front face of an extended member of the plug and inserted into the back end of the optical fiber and adjacent the back end 19 of the pigtail optical fiber 18 simply by inserting the plug therein.

The optical contacts 6, 8, as described, are manufactured at a factory where precision grinding, polishing, and coating techniques can be employed, and as delivered to a craftsman include the substantially nonrecovered back end section 10 of the tube 14 as well as the above-described plug which keeps dirt and foreign matter out of the back end section 10 prior to terminating an optical fiber 2, 4. To use the optical contact 6, 8, a craftsman simply removes the buffer of an end 3 of a glass-on-glass optical fiber being terminated, or removes the cladding if the fiber being terminated is a plastic-clad silica fiber, and then either polishes or cleaves the end 3, 5. Thereafter, the plug is removed from the back end section 10, and the cleaved or polished end 3, 5 of the optical fiber 2, 4 is inserted into the section 10 of the tube 14. Subsequently, the section 10 is recovered by any appropriate means, such as heat, and caused to shrink radially inwards which bonds and aligns the end 3 of the fiber 2 to the back end 19 of the pigtail optical fiber 18 by the common tubing surface of the adhesive liner 16 and heat-recoverable tube 14.

Preferably, the section 10 of the tube 14 is recovered by first heating sections thereof most remote from the grease with heating progressively continuing in the direction of the grease. Such a process allows air or excess grease to escape via the bores 36, thus minimizing air entrapment problems and also serves to minimize the spacing between the back end 19 of the pigtail optical fiber 18 and the front end 3, 5 of the optical fiber 2, 4. A desirable spacing would be less than 0.076 mm. Since the section 10 has been previously expanded circumferentially and longitudinally, as this section recovers, it will tend to recover axially towards the back end 19 as well as radially inward which moves the front end 3, 5 of the optical fiber 2, 4 towards the back end 19 of the pigtail optical fiber 18, and further provides the circumferential force to cause the adhesive liner 16 to bond to the front end 3, 5 of the fiber 2, 4.

It should be readily apparent that such a termination design is advantageous in that the craftsman is not required to have a great deal of skill in terminating the optical fiber 2, 4 to the optical fiber contact 6, 8. Specifically, the user is not required to polish the optical fiber 2, 4 being terminated, size the optical fiber to be terminated with a connector, apply either epoxies, glues, or liquids thereto, and is not required to precisely align the optical fiber being terminated with the contact or with any lenses. Accordingly, a minimum amount of skill in the field is required, thus rendering the optical fiber contact of the invention extremely useful since all the critical manufacturing steps have been previously carried out in a factory where optimal production is best suited and best achieved.

Subsequent to terminating a first optical fiber 2 to a first optical fiber contact 6, and a second optical fiber 4 to a second optical fiber contact 8, it is then necessary to optically connect front ends 21 of the first and second optical fiber contacts 6, 8, this being accomplished by the optical fiber contact assembly 60, schematically illustrated in FIG. 1. FIGS. 6 through 9 illustrate further details of the assembly 60 which will now be described. The assembly 60 is optimally adaptable for optically connecting a plurality of first optical fiber contacts 6, disposed in a ribbon array, with a like plurality of second optical fiber contacts 8, also disposed in a ribbon array, each contact 6 being aligned and optically connected to a corresponding mating contact 8.

The assembly 60 includes a receptacle shell 62 which is matable with a plug shell 64, the shells 62, 64 being retained together by any appropriate means, such as by screws 67 (FIG. 7) or nuts and bolts interconnecting flanges 63 of the shells. The shells 62, 64 bottom at point 65 to a fixed position.

Each contact 6, 8 has a short screw thread 66 formed on an outer circumferential surface thereof, for example, of the order of 1 to 3 turns the screw thread extending rearward from a flange 68 formed on the contact body 22. A contact spring 70 is screwed onto the screw thread 66 so as to extend rearwardly from the flange 68, as illustrated in FIG. 6, with a front end of the spring 70 contacting the flange 68. Since the spring 70 is screwed onto the contact body 22, the spring cannot accidentally fall off the contact body during an assembly or disassembly operation of the optical fiber contact assembly 60. The back end of the contact spring 70 contacts a shoulder 72 of a first wafer 74 interconnected with a second wafer 76, the first and second interconnected wafers forming slots 78, each slot 78 forming an axially extending cavity which receives the back end of an individual contact 6, 8. The wafers 74, 76 in the shell 62 are preferably of identical construction to the wafers 74, 76 in the shell 64.

FIG. 8 illustrates further details of the wafers 74, 76. The first wafer 74 contains a plurality of the slots 78 formed therein, the slots 78 being disposed parallel with one another as illustrated, and having an open top section which is to be closed by the second wafer 76. A back end of the first wafer 74 has the shoulder formed thereat which engages a back end of the contact spring 70, with the wafers being connected so as to preload and compress the springs 70. Front ends of the contacts 6, 8 extend through holes 112 formed in a front face of the wafer 76. Top portions of the slots 78 have narrow portions 82 which are designed so that the contacts 6, 8 cannot be easily removed from the slots 78 along a direction of an arrow 84 which extends perpendicular to a longitudinal axis of the slots 78 to facilitate assembly of the contacts 6, 8 into the slots of the first wafer 74 prior to disposing the second wafer 76 onto the first wafer. The wafers 74, 76 have engaging extensions 86 and recesses 87 respectively on side surfaces thereof which surfaces are slightly resilient, being made preferably of plastic, for snap connecting the wafer 74 with the wafer 76 as the wafer 76 is slid onto the wafer 74 along a direction essentially parallel to the longitudinal axis of the contacts 6, 8 disposed in the slots 78. With this construction the wafers 74, 76 can easily be connected and disconnected from one another thus allowing a craftsman to remove any contact from the slots 78 for cleaning or replacement.

The plug shell 64, in addition to containing the wafers 74, 76 having the contacts 6 or 8 disposed in the slots 78, further contains an alignment insert 88 which is connected to the plug shell 64 via a pin 90. The pin prevents the alignment insert from being separated from the plug shell 64 and inadvertently being lost. The alignment insert 88 further contains a longitudinal slot 92 which extends parallel with slots 78 in the wafer 74 so as to provide a means for sliding the alignment insert 88 onto front ends of the contacts 6, 8 so that the front ends of the contacts 6, 8 are received in longitudinal holes 94 contained within the alignment insert 88, the holes 94 being parallel with the slots 78. Thus, it can readily be understood that, to remove the alignment insert from the contacts 8, it is simply necessary to disconnect the plug shell 62 from the plug shell 64, move the alignment insert 88 longitudinally in a direction of the longitudinal axis of the contacts 8 and away from front ends thereof, and then subsequently pivot the alignment insert about the pin 90. With such a construction, front ends of the contacts 8 are easily accessible for cleaning, and a minimum risk exists that the alignment insert will be lost in the cleaning process due to the engagement via the pin 90.

The alignment insert 88 comprises two parts which are bonded at joint 96, with the alignment insert containing the plurality of longitudinal holes 94, each for receiving one of the contacts 6 and a mating contact 8 to be optically connected therewith. Within each hole 94 is contained an alignment sleeve 98, retained in place by flanges 99. Each alignment sleeve 98 comprises a radial spring in the form of a cylinder that is split axially, a spring constant of each alignment sleeve being chosen so as to allow compression and extension of the contact springs 70 during shock and vibration loads.

The alignment sleeve further acts as a damper so as to reduce shock- and vibration-induced displacements. The alignment sleeve for each mating set of first and second contacts 6, 8 can be a single sleeve or multiple sleeves optionally tied together. Ends of the alignment sleeves, the alignment insert, and the contact bodies 22 of the contacts 6, 8 are preferably chamfered to facilitate guiding of the contacts into the alignment sleeve.

As illustrated in FIG. 9 since each alignment sleeve 98 comprises a cylinder split axially which contains front ends of a contact 6 and a mating contact 8, since outside cylindrical surfaces of the contacts 6, 8 are circular while an inner surface of the alignment sleeve is necessarily not, it can readily be understood that the alignment sleeve contacts each of the contacts 6, 8 along three longitudinal lines, ends of which are illustrated by reference numerals 100, 101, 102. Since the longitudinal line 100 is disposed along a bottom-most portion of the contacts 6, 8, bottom portions of the contacts 6, 8 are co-linearly aligned thus achieving excellent alignment between the front ends of the mating contacts 6, 8. Accordingly, the alignment sleeve 98 provides an excellent alignment means. The lines 101, 102 do not necessarily have to be located on circumferential ends of the sleeve 98, as illustrated in FIG. 9, and can alternatively be located at other circumferential locations, for example, lines ending at points 103, 104, etc., by appropriate shaping.

A dynamic seal 46 is bonded to the alignment insert 88 on opposite sides thereof where the contacts are inserted therein to provide a moisture seal for the front ends 21 of the contacts 6, 8 being optically interconnected. The dynamic seal further prevents foreign matter from entering the interface between the front ends 21 of the contacts 6, 8. The seal 46 is resiliently formed and designed to accommodate deflections induced by movements of the contacts 6, 8. The dynamic seal has holes 48 therein for each contact 6, 8 to be received, each hole having an inside diameter smaller than an outside diameter of the contact body of the contact being placed there through, thereby providing a stretched interface fit between the seal 46 and the contact 6, 8. The seal therefore allows necessary movement of the contacts created by vibration or shock loads, and the seal further provides a lead-in guide for the contacts to facilitate insertion thereof into the alignment insert 88 and the alignment sleeve 98. Spaces 50 are provided on opposite sides of the dynamic seal to allow movement and displacement of the resilient seal material.

One edge 87 of each dynamic seal 46 has a triangular shape and engages the wafer 76 to provide a minimum amount of resistance during displacement of the seal due to the buildup of tolerances in the components making up the connector assembly. Accordingly, it will be appreciated that the basic seal path sealed by the dynamic seal occurs where the dynamic seal 46 is bonded to the alignment insert 88, and also where the dynamic seal meets the contact 6 or 8.

The assembly 60 provides a dependable, reliable, efficient, and simple means of aligning and interconnecting a plurality of first contacts 6, preferably disposed in ribbon form, with a like plurality of second contacts 8 also disposed in ribbon form. Front ends of the contacts 6, 8 are easily accessible for cleaning, and the construction of the assembly 60 is such that a minimum amount of risk exists that any of the tiny parts making up the assembly 60 can inadvertently be lost. Therefore, the contacts 6, 8 and the assembly 60 provide a superior means for terminating and optically connecting a plurality of first optical fibers 2 with a like plurality of second optical fibers 4 with a minimum amount of attenuation, the assembly 60 being capable of withstanding severe shock and vibration loads.

Though the invention has been described with reference to certain preferred embodiments thereof, it should be understood that the invention is not to be limited thereby and is only to be limited by the appended claims.

What is claimed is:

1. An optical fiber contact comprising:
  a tube made of an unstable memory material, said memory material tube having been expanded forming first and second adjacent axially aligned hollow tube sections;
  a short section of optical fiber located in the first tube section and not in the second tube section, said first tube section having been recovered around said short section of optical fiber so as to tightly adhere thereto, said second tube section having been maintained substantially unrecovered while said first tube section is recovered; and a contact body surrounding said first and second tube sections.

2. The contact as claimed in claim 1, said contact body being sized and said second tube section being expanded such that radial expansion of said second tube section is substantially limited by said contact body when said second tube section is recovered about an optical fiber being terminated.

3. The contact as claimed in claim 2, further comprising first and second aligned holes formed in said tube and said contact body in a vicinity of a back end of the pigtail optical fiber for allowing excess air to escape from said second tube section when said second tube section is recovered.

4. The contact as claimed in claim 3, further comprising a grease located adjacent a back end of the pigtail optical fiber which wets the back end of the pigtail optical fiber.

5. The contact as claimed in claim 4, the grease having an index of refraction substantially equal to an index of refraction of a core of the pigtail optical fiber.

6. The contact as claimed in claim 4, further comprising an adhesive liner formed on an inside surface of the first and second tube sections prior to recovery thereof.

7. The contact as claimed in claim 6, the adhesive liner consisting essentially of $PVF_2$ or polyamide.

8. The contact as claimed in claim 6, said adhesive liner having an index of refraction lower than that of said core of said pigtail optical fiber, said pigtail optical fiber consisting only of a core, said adhesive liner and said core forming a waveguide.

9. The contact as claimed in claim 4, said pigtail optical fiber comprising a glass core surrounded by glass cladding.

10. The contact as claimed in claim 6, further comprising an adhesive located between said tube and said contact body for securing said tube to said contact body.

11. The contact as claimed in claim 10, said contact body having a flange thereon.

12. The contact as claimed in claim 2, further comprising means for recessing a front axial end of said pigtail optical fiber from a front axial end of said contact body.

13. The contact as claimed in claim 12, said recessing means comprising a sleeve secured to an outer circumferential surface of said contact body, said sleeve extending axially a controlled distance beyond said front axial end of said pigtail optical fiber.

14. The contact as claimed in claim 12, said recessing means comprising a single circumferential ring formed on the front axial end of said contact body.

15. The contact as claimed in claim 12, said recessing means comprising a plurality of perturberances formed on said front axial end of said contact body.

16. The contact as claimed in claim 12, said recessing means comprising a thin film deposited on a front face of the contact body.

17. The contact as claimed in claim 12, said front axial end of said pigtail optical fiber being polished and coated with an anti-reflective coating subsequent to securing said tube and said contact body together.

18. The contact as claimed in claim 1, said tube being expanded both circumferentially and radially prior to inserting said pigtail optical fiber in said first tube section.

19. A method of terminating an optical fiber, comprising the steps of:

forming a tube from a memory material;
expanding said tube forming first and second adjacent axially aligned tube sections;
placing a short section of optical fiber within said first tube section and not within said second tube section;
recovering said first tube section around said short section of optical fiber causing an inner diameter of first tube section to shrink around said short section of optical fiber;
preventing said second tube section from substantially recovering radially inward as said first tube section is recovered;
inserting an end of an optical fiber to be terminated in said nonrecovered second tube section; and
recovering said second tube section about said optical fiber to be terminated.

20. The method as claimed in claim 19, wherein said tube is expanded both circumferentialy and longitudinally to form said first and second tube sections.

21. The method as claimed in claim 19, further comprising the step of placing an adhesive liner within said first and second tube sections prior to recovery of either one thereof.

22. The method as claimed in claim 19, further comprising the step of placing an adhesive around said recovered first tube section and joining said recovered first tube section to a contact body via said adhesive.

23. The method as claimed in claim 22, further comprising the steps of:
forming an aligned hole in said tube and contact body;
placing an index-matching grease in a vicinity of a back end of said pigtail optical fiber subsequent to recovering said first tube section; and
polishing a front end of said pigtail optical fiber subsequent to recovering said first tube section therearound and securing said tube to said contact body.

24. A method of making an optical fiber contact, comprising the steps of:
forming a tube from a memory material;
expanding said tube material forming first and second adjacent axially aligned hollow tube sections;
placing a short section of optical fiber within said first tube section and not within said second tube section;
recovering said second tube section around said short section of optical fiber causing an inner diameter of said first tube section to shrink about said short section of optical fiber and tightly adhere thereto; and
preventing said second tube section from substantially recovering radially inward as said first tube section is recovered.

25. A method as claimed in claim 24, said tube being expanded both circumferentially and longitudinally.

26. The method as claimed in claim 24, further comprising the step of coating an inner circumferential surface of said first and second tube sections with an adhesive prior to recovering either of said first and second tube sections, said adhesive comprising a hot-melt adhesive.

* * * * *